US012760870B2

(12) United States Patent
Chou et al.

(10) Patent No.: US 12,760,870 B2
(45) Date of Patent: Oct. 13, 2026

(54) LIGHT SOURCE MODULE AND METHOD FOR IMPROVING UNIFORMITY THEREOF

(71) Applicant: Ennostar Corporation, Hsinchu City (TW)

(72) Inventors: Sheng-Wei Chou, Hsinchu City (TW); Jung-Cheng Chang, Hsinchu City (TW)

(73) Assignee: ENNOSTAR CORPORATION, Hsinchu City (TW)

( * ) Notice: Subject to any disclaimer, the term of this patent is extended or adjusted under 35 U.S.C. 154(b) by 0 days.

(21) Appl. No.: 18/913,018

(22) Filed: Oct. 11, 2024

(65) Prior Publication Data

US 2026/0104157 A1 Apr. 16, 2026

(30) Foreign Application Priority Data

Oct. 16, 2023 (TW) ................................ 112139332

(51) Int. Cl.

| | |
|---|---|
| ***F21V 19/00*** | (2006.01) |
| *F21Y 105/10* | (2016.01) |
| *F21Y 105/16* | (2016.01) |
| *F21Y 113/13* | (2016.01) |
| *F21Y 115/10* | (2016.01) |

(52) U.S. Cl.

CPC ....... *F21V 19/0015* (2013.01); *F21Y 2105/10* (2016.08); *F21Y 2105/16* (2016.08); *F21Y 2113/13* (2016.08); *F21Y 2115/10* (2016.08)

(58) Field of Classification Search

CPC ............. F21V 19/0015; F21Y 2105/16; F21Y 2113/10; F21Y 2113/11; F21Y 2113/13; F21Y 2115/10

See application file for complete search history.

(56) References Cited

U.S. PATENT DOCUMENTS

| | | | | |
|---|---|---|---|---|
| 7,002,546 | B1 | 2/2006 | Stuppi | |
| 8,378,958 | B2 | 2/2013 | Chen | |
| 2007/0274093 | A1 | 11/2007 | Haim | |
| 2008/0007509 | A1 | 1/2008 | Lankhorst | |
| 2008/0192465 | A1 | 8/2008 | Huan | |
| 2017/0059120 | A1* | 3/2017 | Kataoka | F21V 23/02 |
| 2017/0261164 | A1* | 9/2017 | Ogata | F21V 29/76 |
| 2018/0249549 | A1* | 8/2018 | Kim | F21K 9/00 |
| 2022/0225487 | A1* | 7/2022 | De Best | F21V 23/04 |

(Continued)

OTHER PUBLICATIONS

Chinese language office action dated Jul. 30, 2024, issued in application No. TW 112139332.

*Primary Examiner* — James R Greece

*Assistant Examiner* — Michael Chiang

(74) *Attorney, Agent, or Firm* — McClure, Qualey & Rodack, LLP

(57) ABSTRACT

A light source module is provided. The light source module includes a substrate for the product, a plurality of first light sources and a plurality of second light sources. The first light sources are disposed on the substrate for the product, wherein the first light sources provide a first light beam, and the first light beam has a first chromaticity. The second light sources are disposed on the substrate for the product, wherein the second light sources provide a second light beam, the second light beam has a second chromaticity, and there is a chromaticity difference (Rx, Ry) between the first chromaticity and the second chromaticity.

12 Claims, 7 Drawing Sheets

(56) References Cited

U.S. PATENT DOCUMENTS

| | | | | |
|---|---|---|---|---|
| 2024/0072220 | A1* | 2/2024 | Tamura | H10H 20/8513 |
| 2025/0035287 | A1* | 1/2025 | Yoshida | F21V 9/30 |
| 2025/0109836 | A1* | 4/2025 | Kususe | F21V 19/0015 |

* cited by examiner

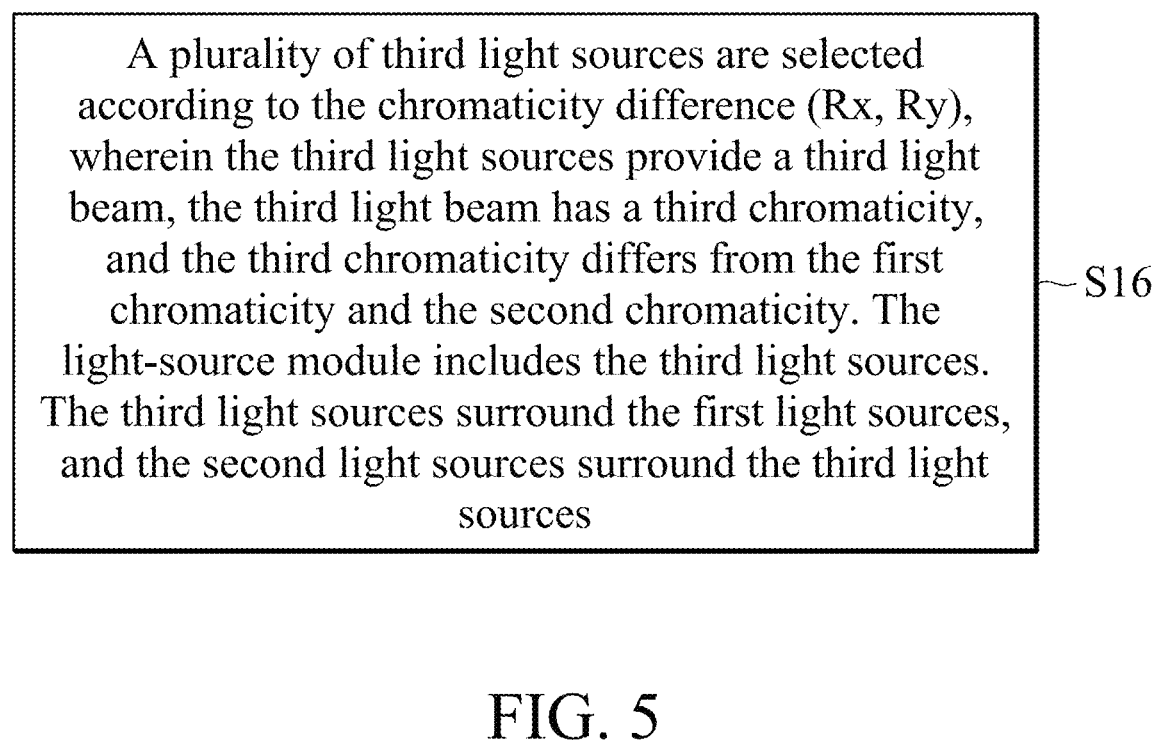

A plurality of third light sources are selected according to the chromaticity difference (Rx, Ry), wherein the third light sources provide a third light beam, the third light beam has a third chromaticity, and the third chromaticity differs from the first chromaticity and the second chromaticity. The light-source module includes the third light sources. The third light sources surround the first light sources, and the second light sources surround the third light sources

S16

FIG. 5

LIGHT SOURCE MODULE AND METHOD FOR IMPROVING UNIFORMITY THEREOF

TECHNICAL FIELD

The present application relates to a method for improving uniformity, and, in particular, to a method for improving uniformity of a light source module.

CROSS REFERENCE TO RELATED APPLICATIONS

This application claims priority of Taiwan Patent Application No. 112139332, filed on Oct. 16, 2023, the entirety of which is incorporated by reference herein.

BACKGROUND

Description of the Related Art

In conventional direct-type light source modules, multiple light-emitting diode light sources are arranged in a matrix. Conventionally, light-emitting diodes with a single chromaticity range are utilized to emit light. After the light emitted by these light-emitting diodes is mixed, the brightness and color may be uneven between the central area and peripheral areas of the light source module. As the size of the display becomes larger, the above-mentioned uneven color and brightness between the central area and the peripheral area becomes increasingly obvious. Sometimes, this non-uniformity exceeds the manufacturer's tolerance for color uniformity deviation of the light source module, causing it to fail the product specification requirements.

BRIEF SUMMARY

An embodiment of the present application provides a method for improving uniformity of a light source module. The method includes the following steps. First, a light source module for testing is provided. The light source module for testing includes a plurality of first light sources and a substrate for testing. The first light sources provide a first light beam. The first light beam has a first chromaticity. The first light sources are arranged on the substrate for testing. The light source module for testing has a first area and a second area. Then, a first central chromaticity is obtained from the first area, and a first periphery chromaticity is obtained from the second area. Next, a chromaticity difference (Rx, Ry) between the first central chromaticity and the first periphery chromaticity is obtained by calculation. Then, a plurality of second light sources are selected according to the chromaticity difference (Rx, Ry), wherein the second light sources provide a second light beam, and the second light beam has a second chromaticity. Next, a light source module for the product is provided. The light source module for the product comprises the first light sources, the second light sources and a substrate for the product. The first light sources and the second light sources are disposed on the substrate for the product. The second light sources surround the first light sources.

Using the light source module of the embodiment of the present application, the differ second light sources of specific chromaticity is used to provide a compensation effect. Therefore, the difference between the central chromaticity and the periphery chromaticity of the light source module for the product can be reduced within the range between 0.001 and 0.002. Compared with the conventional art, the light source module of the embodiment of the present application provides better uniformity.

BRIEF DESCRIPTION OF THE DRAWINGS

The present application can be more fully understood by reading the subsequent detailed description and examples with references made to the accompanying drawings, wherein:

FIG. 5 shows another step of the method for improving uniformity of a light source module of the embodiment of the present application;

DETAILED DESCRIPTION

The following description is made for the purpose of illustrating the general principles of the present application and should not be taken in a limiting sense. The scope of the present application is best determined by reference to the appended claims.

In the embodiments of the present application, the light sources of different colors are utilized to solve the problems of uneven chromaticity mentioned above. The lights emitted by the light sources are mixed to achieve a more uniform chromaticity performance. The light source referred to here can be the component which can emit light, such as an LED package, an LED chip, or a mini LED. In addition, the arrangement of light sources of different colors can further improve the uniformity. The following description shows how to choose light sources of different colors.

Figure 1:
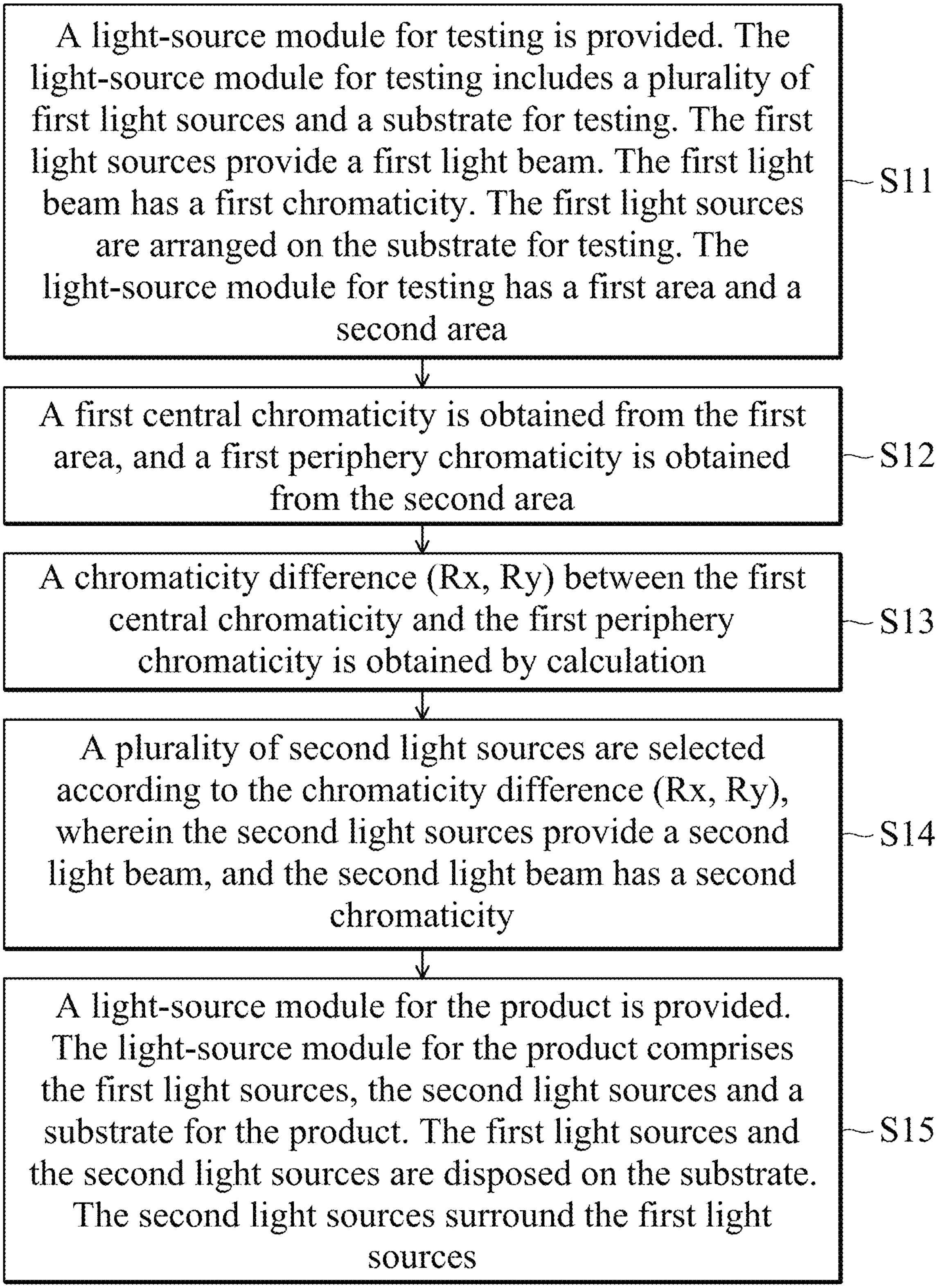
FIG. 1 shows the method for improving uniformity of a light source module of the embodiment of the present application.

FIG. 1 shows a method for improving uniformity of a light source module of the present application. With reference to FIG. 1, the method includes the following steps. First, a light source module for testing is provided. The light source module for testing includes a plurality of first light sources and a substrate for testing. The first light sources provide a first light beam. The first light beam has a first chromaticity. The first light sources are arranged on the substrate for testing. The light source module for testing has a first area and a second area (S11). Then, a first central chromaticity is obtained from the first area, and a first periphery chromaticity is obtained from the second area (S12). Next, a chromaticity difference (Rx, Ry) between the first central chromaticity and the first periphery chromaticity is obtained by calculation (S13). Then, a plurality of second light sources are selected according to the chromaticity difference (Rx, Ry), wherein the second light sources provide a second light beam, and the second light beam has a second chromaticity (S14).

Next, a light source module for the product is provided. The light source module for the product comprises the first light sources, the second light sources and a substrate for the product. The first light sources and the second light sources are disposed on the substrate for the product. The second light sources surround the first light sources (S15).

In one embodiment, the second light sources are selected from the range other than the first light sources (testing light sources).

In one embodiment, the above-mentioned chromaticity can be obtained through experiment or software simulation. The above disclosure does not mean to restrict the present application.

Figure 2:
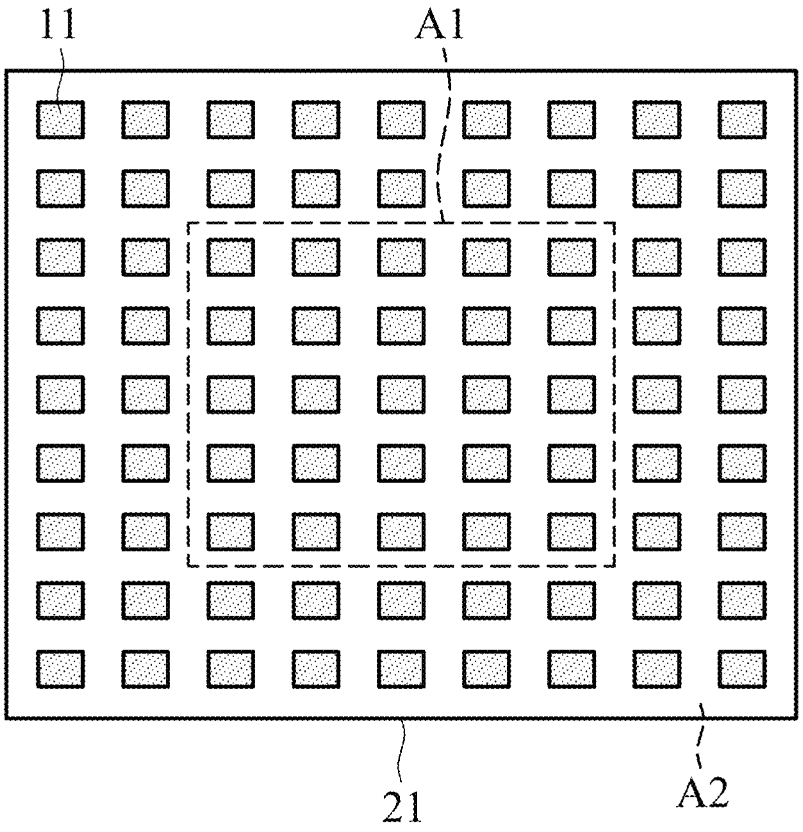
FIG. 2 shows the substrate for testing of the embodiment of the present application.

FIG. 2 shows the substrate for testing of the embodiment of the present application. With reference to FIG. 2, the first light sources 11 are disposed on the substrate for testing 21. The light source module for testing has a first area A1 and a second area A2. The first central chromaticity is obtained from the first area A1, and a first periphery chromaticity is obtained from the second area A2.

Figure 3:
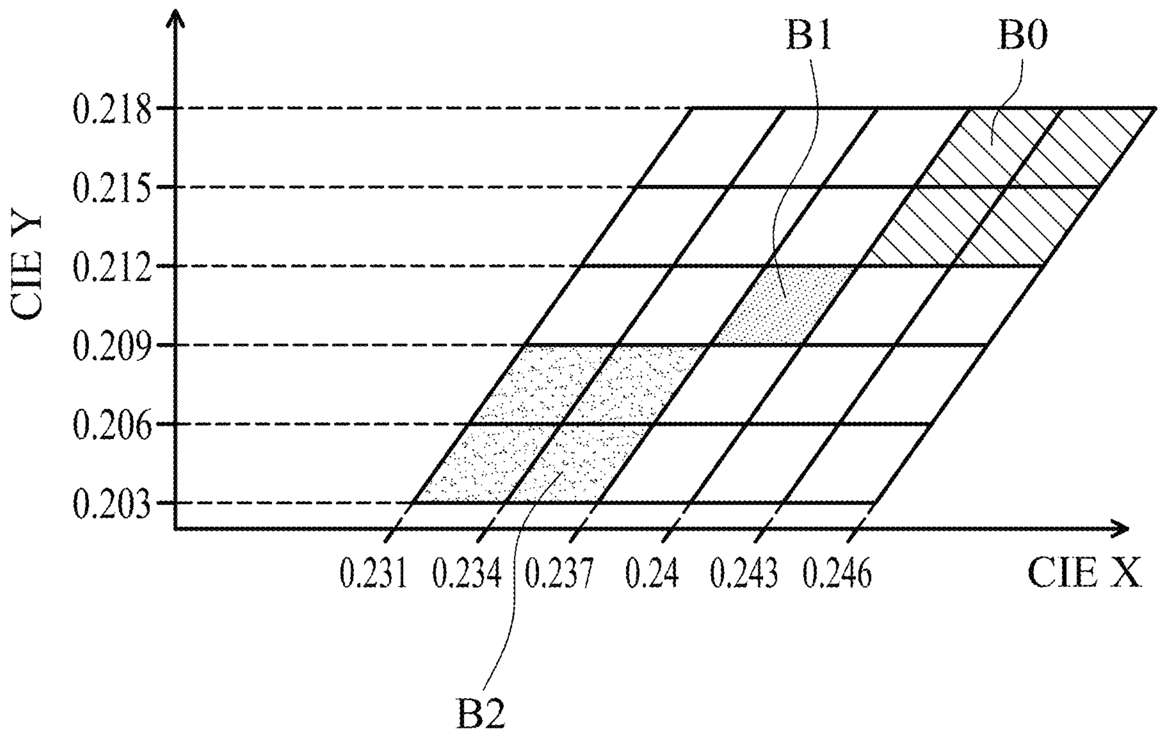
FIG. 3 shows the chromaticity variation measured from the substrate for testing of the embodiment of the present application.

FIG. 3 shows the chromaticity variation measured from the substrate for testing of the present application. With reference to FIG. 3, in one embodiment, the first central chromaticity (X1, Y1) of the light sources like the chromaticity of the first light sources falls in area B1 (the area in this embodiment is single grid) of the CIE 1931 chromaticity diagram. The first periphery chromaticity (X0, Y0) falls in the area B0 (the area in this embodiment is four grids) adjacent to the area B1. In other words, the chromaticity difference (Rx, Ry) can be obtained by subtracting the first periphery chromaticity (X0, Y0) from the first central chromaticity (X1, Y1). In one embodiment, the absolute value of the chromaticity difference between each point in area B0 and area B1 is less than 0.006. The disclosure is not meant to restrict the present application. For example, in a larger-sized light source module, the absolute value of the chromaticity difference between each point in area B0 and area B1 may be greater than 0.006.

In one embodiment, a plurality of second light sources is selected according to the chromaticity difference (Rx, Ry). The second light sources are selected from the range other than the first light sources (from light sources module for testing). The second light sources provide a second light beam, and the second light beam has a second chromaticity (X2, Y2). For example, the second chromaticity (X2, Y2) falls within the area B2 of the CIE 1931 chromaticity diagram like the area in four grads in this embodiment in FIG. 3. In other words, the formula for obtaining the second chromaticity (X2, Y2) is as follows:

$$X2 = X1 + Rx$$

$$Y2 = Y1 + Ry$$

Figure 4:
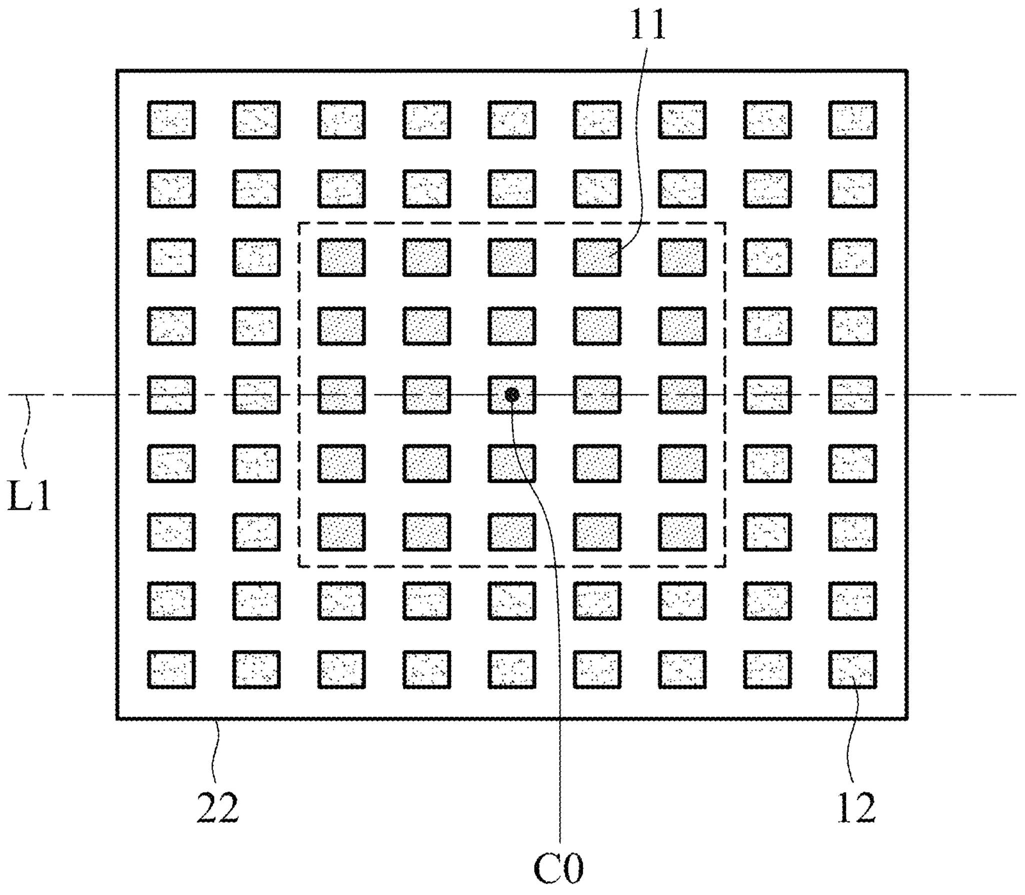
FIG. 4 shows a light source module for the product of the embodiment of the present application.

FIG. 4 shows a light source module for the product of the embodiment of the present application. With reference to FIG. 4, in this embodiment, the first light sources 11 and the second light sources 12 are disposed on the substrate for the product 22. The second light sources 12 surround the first light sources 11.

In one embodiment of the present application, the chromaticity difference (Rx, Ry) is calculated by subtracting the first periphery chromaticity (X0, Y0) from the first central chromaticity (X1, Y1). That is, Rx and Ry of the chromaticity difference (Rx, Ry) can be positive or negative. In one embodiment, the second chromaticity is equal to the first chromaticity (X1, Y1) plus the chromaticity difference (Rx, Ry).

In another embodiment, based on different calculation methods of the chromaticity difference (Rx, Ry), or other design considerations such as uniformity, the second chromaticity (X2, Y2) may also be equal to the first chromaticity minus the chromaticity difference (Rx, Ry). The disclosure is not meant to restrict the present application.

FIG. 5 shows another step of the method for improving uniformity of a light source module of the present application. With reference to FIG. 5, in one embodiment, the method for improving uniformity of the light source module further comprises the following step. A plurality of third light sources are selected according to the chromaticity difference (Rx, Ry), wherein the third light sources provide a third light beam, the third light beam has a third chromaticity (X3, Y3), and the third chromaticity differs from the first chromaticity and the second chromaticity. The light source module includes the third light sources. The third light sources surround the first light sources, and the second light sources surround the third light sources (S16).

Figure 6:
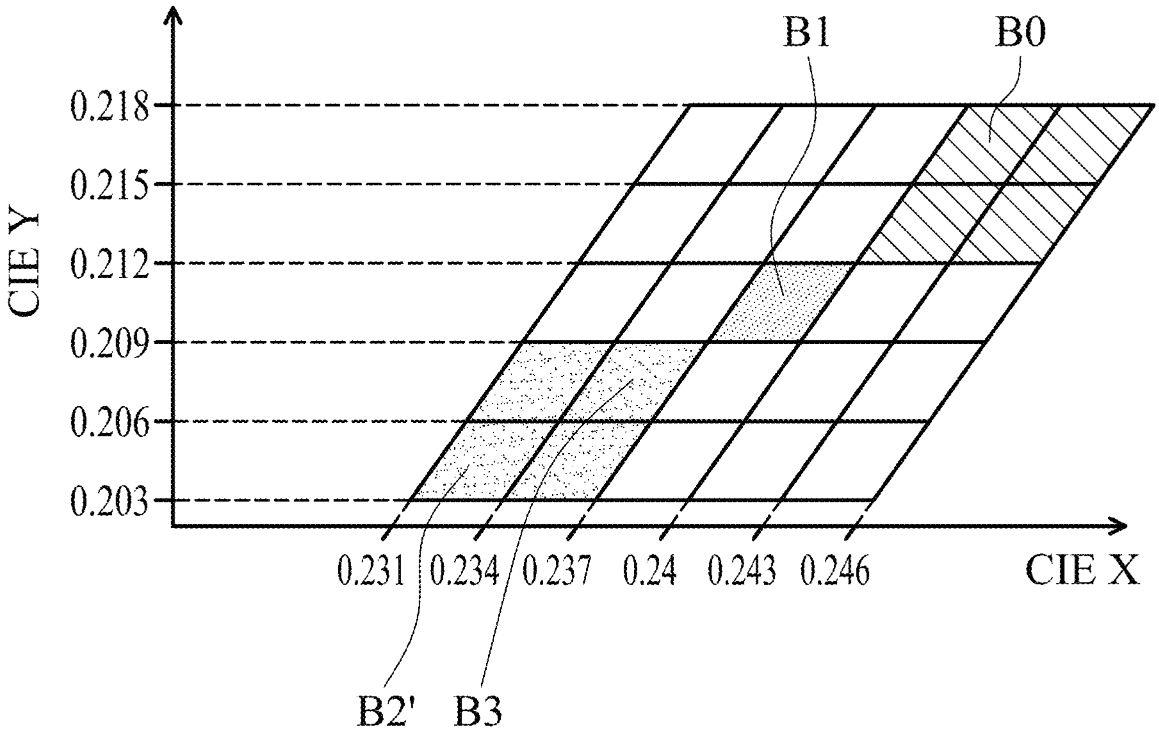
FIG. 6 shows a method for selecting the third light sources according to an embodiment of the present application.

FIG. 6 shows method for selecting the third light sources according to an embodiment of the present application. With referring to FIG. 6, in one embodiment, the first chromaticity (X1, Y1) falls in the area B1 of the CIE 1931 chromaticity diagram (the area in this embodiment is single grid). The aforementioned first periphery chromaticity (X0, Y0) falls in the area B0 (the area in this embodiment is four grids) adjacent to the area B1. The second chromaticity (X2, Y2) falls in the area B2' (the area in this embodiment is single grid). The third chromaticity (X3, Y3) falls in area B3 (the area in this embodiment is single grid). In one embodiment, the third chromaticity is equal to the first chromaticity plus a compensation value $$\left(\frac{Rx}{2}, \frac{Ry}{2}\right).$$

In other words, the formula of the third chromaticity (X3, Y3) is as follows:

$$X3 = X1 + Rx/2$$

$$Y3 = Y1 + Ry/2$$

Figure 7:
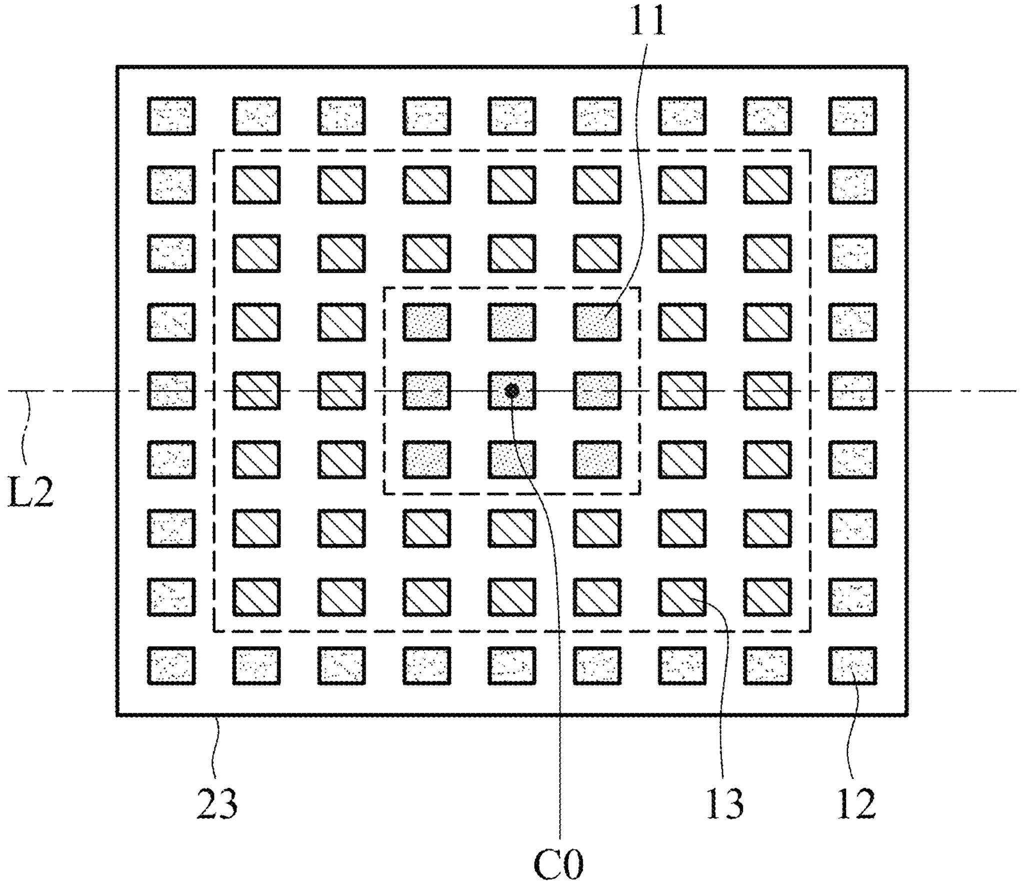
FIG. 7 shows a light source module with the arrangement of the third light sources of the embodiment of the present application.

FIG. 7 shows the arrangement of the third light sources of the embodiment of the present application. With reference to FIG. 7, the first light sources 11, the second light sources 12 and the third light sources 13 are disposed on the substrate for the product for the product 23. The third light sources surround the first light sources 11, and the second light sources 12 surround the third light sources 13.

With reference to FIG. 4, in another embodiment, the present application provides a light source module. The light source module includes a substrate for the product 22, a plurality of first light sources 11 and a plurality of second light sources 12. The first light sources 11 are disposed on the substrate for the product 22, wherein the first light sources provide a first light beam. The first light beam has a first chromaticity. The second light sources 12 are disposed on the substrate for the product 22 and surround the first sources 11, wherein the second light sources 12 provide a second light beam, the second light beam has a second chromaticity, and there is a chromaticity difference (Rx, Ry) between the first chromaticity and the second chromaticity.

In one embodiment, the absolute value of Rx is less than 0.006, and the absolute value of Ry is less than 0.006. For example, the absolute value of Rx can be 0.005, and the absolute value of Ry can be 0.005. As mentioned above, the disclosure is not meant to restrict this application. For example, in a larger sized light source module, the absolute value of Rx may be greater than 0.006, and the absolute value of Ry may also be greater than 0.006.

In one embodiment, the first light sources 11 are arranged in a matrix. However, the disclosure is not meant to restrict this application. For example, in another embodiment, the first light sources 11 may be arranged in a concentric circle.

With reference to FIG. 4, in one embodiment, the light source module has a central point C0. An extending line L1 passes through the central point C0. The ratio of the number of first light sources 11 to the number of second light sources 12 on the extending line L1 is between 2:1 and 4:3. In this embodiment, the difference between the central chromaticity and the periphery chromaticity of the light source module (the light source module for the product) can be reduced within the range between 0.001 and 0.002.

With reference to FIG. 7, in another embodiment, the present application provides a light source module. The light source module includes a substrate for the product 23, a plurality of first light sources 11, a plurality of second light sources 12 and a plurality of third light sources 13. The third light sources 13 are disposed on the on the substrate for the product 23 and provide a third light beam. The third light beam has a third chromaticity. The third chromaticity differs from the first chromaticity and the second chromaticity. The third light sources 13 surround the first light sources 11, and the second light sources 12 surround the third light sources 13.

With reference to FIG. 7, in one embodiment, the light source module has a central point C0. An extending line L2 passes through the central point C0. The ratio of the number of first light sources to the number of third light sources and the number of second light sources on the extending line is 2:2:1. In this embodiment, the difference between the central chromaticity and the periphery chromaticity of the light source module (the light source module for the product) can be reduced to about 0.001.

Using the light source module of the embodiment of the present application, the second light sources of specific chromaticity is used to provide a compensation effect. Therefore, the difference between the central chromaticity and the periphery chromaticity of the light source module for the product according to the embodiment of the present application can be reduced within the range between 0.001 and 0.002. Compared with the conventional art, the light source module of the embodiment of the present application provides improved uniformity.

While the present application has been described by way of example and in terms of the preferred embodiments, it should be understood that the present application is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light source module comprising:

a substrate;

a plurality of first light sources disposed on the substrate, wherein the first light sources provide a first light beam, the first light beam has a first chromaticity (X1, Y1); and a plurality of second light sources disposed on the substrate, wherein the second light sources provide a second light beam, the second light beam has a second chromaticity (X2, Y2), and there is a chromaticity difference (Rx, Ry) between the first chromaticity (X1, Y1) and the second chromaticity (X2, Y2), wherein the Rx of the chromaticity difference (Rx, Ry) is greater than 0 and less than 0.006, and the Ry of the chromaticity difference (Rx, Ry) is greater than 0 and less than 0.006.

2. The light source module as claimed in claim 1, wherein the light source module has a central point, an extending line passes through the central point, and the ratio of the number of first light sources to the number of second light sources on the extending line is between 2:1 and 4:3.

3. The light source module as claimed in claim 1, further comprising a plurality of third light sources, wherein the third light sources are disposed on the substrate, the third light sources provide a third light beam, the third light beam has a third chromaticity (X3, Y3), the third chromaticity (X3, Y3) differs from the first chromaticity (X1, Y1) and the second chromaticity (X2, Y2), the third light sources surround the first light sources, and the second light sources surround the third light sources.

4. The light source module as claimed in claim 3, wherein the light source module has a central point, an extending line passes through the central point, and the ratio of the number of first light sources to the number of third light sources and the number of second light sources on the extending line is 2:2:1.

5. The light source module as claimed in claim 3, wherein the third chromaticity (X3, Y3) equals the first chromaticity (X1, Y1) plus a compensation value $$\left(\frac{Rx}{2}, \frac{Ry}{2}\right).$$

6. The light source module as claimed in claim 1, wherein the first light sources are arranged in a matrix or concentric circles.

7. The light source module as claimed in claim 1, wherein the first light sources are selected from LED packages or LED chips.

8. The light source module as claimed in claim 7, wherein the LED chips are mini LEDs.

9. The light source module as claimed in claim 1, wherein the second chromaticity (X2, Y2) equals the first chromaticity (X1, Y1) plus the chromaticity difference (Rx, Ry).

10. The light source module as claimed in claim 1, wherein the second chromaticity (X2, Y2) equals the first chromaticity (X1, Y1) minus the chromaticity difference (Rx, Ry).

11. A light source module comprising:

a substrate;

a plurality of first light sources disposed on the substrate, wherein the first light sources provide a first light beam, the first light beam has a first chromaticity (X1, Y1);

a plurality of second light sources disposed on the substrate, wherein the second light sources provide a second light beam, the second light beam has a second chromaticity (X2, Y2), and there is a chromaticity difference (Rx, Ry) between the first chromaticity (X1, Y1) and the second chromaticity (X2, Y2), and a plurality of third light sources, wherein the third light sources are disposed on the substrate, the third light sources provide a third light beam, the third light beam has a third chromaticity (X3, Y3), the third chromaticity (X3, Y3) differs from the first chromaticity (X1, Y1) and the second chromaticity (X2, Y2), the third light sources surround the first light sources, and the second light sources surround the third light sources, wherein the light source module has a central point, an extending line passes through the central point, and the ratio of the number of first light sources to the number of third light sources and the number of second light sources on the extending line is 2:2:1.

12. The light source module as claimed in claim 11, wherein the third chromaticity (X3, Y3) equals the first chromaticity (X1, Y1) plus a compensation value $$\left(\frac{Rx}{2}, \frac{Ry}{2}\right).$$

* * * * *